United States Patent [19]

Denney et al.

[11] 3,729,725

[45] Apr. 24, 1973

[54] REDUNDANT RECORDATION TO REDUCE ACCESS TIME

[75] Inventors: Joseph M. Denney, Palos Verdes Estates; Ronald B. Selden, Canoga Park, both of Calif.

[73] Assignee: Digital Development Corporation, San Diego, Calif.

[22] Filed: Sept. 13, 1971

[21] Appl. No.: 179,911

[52] U.S. Cl. ......................340/174.1 G, 340/174.1 C

[51] Int. Cl. ................................................G11b 5/02

[58] Field of Search ................340/174.1 G, 174.1 C, 340/174.1 L, 174.1 P, 174.1 D; 179/100.2 MI, 100.2 E

[56] References Cited

UNITED STATES PATENTS

| | | | |
|---|---|---|---|
| 3,122,726 | 2/1964 | King, Jr. et al. | 340/174.1 P |
| 3,329,944 | 7/1967 | Leinberger et al. | 340/174.1 D |
| 2,680,239 | 6/1954 | Daniels et al. | 340/174.1 D |
| 3,225,183 | 12/1965 | Horrell | 340/174.1 D |
| 2,951,236 | 8/1960 | Covely | 340/174.1 P |
| 3,196,420 | 7/1965 | Francon | 340/174.1 P |

*Primary Examiner*—Vincent P. Canney
*Attorney*—Smyth, Roston & Pavitt

[57] ABSTRACT

A memory including first and second regions along which data can be stored and first and second read/write heads. The read/write heads write information on the first and second regions, respectively. The heads are controlled so that they write the same information on both of the regions with the information written on the second region being out of phase with the information written on the first region. Each of the heads reads only the information which it recorded. By delaying the initiation of the write operation on the second track for one-half a revolution of the regions, access time equal to a two head per track system is obtained.

12 Claims, 6 Drawing Figures

REDUNDANT RECORDATION TO REDUCE ACCESS TIME

BACKGROUND OF THE INVENTION

In a typical disc memory, a group of memory discs is suitably assembled and read/write heads are used to perform the read and write functions. As is well-known, information is stored along circular concentric tracks on the discs. One problem inherent in a system of this kind is reducing access time.

In some memories the head must be moved radially to locate the track where the desired information is located. However, in the head per track memory, one head is provided for each track with the result that the appropriate track is electronically selected and no radial mechanical searching is necessary.

The elimination of the mechanical track search reduces access time. However, even in the head per track system, the disc must be rotated until the appropriate information or sector confronts the head. One approach which is useful in reducing the time required for the necessary rotational movement of the disc is to increase the angular velocity of the disc. Unfortunately, this introduces significant dynamic balancing problems which impose a practical upper limit on the maximum angular velocity of the disc.

Another approach is to use two heads per track and space the heads 180° apart along the track. With this system one of the heads is selected to write information on the track with such selection being a function of the proximity of such head to the location on the disc at which the information is to be written. Similarly for readout the head closest to the information to be read is selected. This results in cutting average access time in half as compared to the single head per track system.

With the two head per track system, the head which writes the information may not be selected to read the information. Statistically, it would be expected that in approximately one-half of the instances the head which performs the write operation would not perform the read operation. The use of different heads for the read and write operations inherently introduces misalignment between the recorded data on the disc and the read head. This is very undesirable in that output falls in proportion to the amount of the misalignment.

SUMMARY OF THE INVENTION

The present invention utilizes only a single head per track and solves the misalignment problem noted above while fully retaining the rapid access time of a two-head per track memory. This is accomplished by using first and second read/write heads to record the same information on different tracks and delaying the writing of the information on the second track so that it is out of phase with the information on the first track.

For the read operation, each head reads only the information which it previously wrote. This eliminates the problems heretofore experienced with misalignment of the recorded data or track and the head selected for the read operation.

When the information is recorded in this fashion, any bit of the information on the first track is angularly spaced from the first read/write head a different number of degrees than the angular spacing between the corresponding bit of information on the second track and the second read/write head. The head selected for reading is the head closest to the information which it wrote. Thus rapid access time is obtained. Although only one head per track is used, access time is as rapid as in a two-head per track memory. Thus the memory of this invention is a virtual two-head per track memory. Access for the write operation is also very rapid.

In order for the information on the two tracks to be out of phase, the initiation of the write operation on the second track must be delayed until after the initiation of the write operation on the first track. The delay must be for a number of degrees which is not an even multiple of 360°. For the maximum reduction in average access time, the delay should be for 180°. Although the delay could be for over 360°, for example, 540°, which is effectively 180°, this would increase the write time. To the extent that the delay is other than 180° or effectively 180° average access time increases.

The two redundant tracks can be on any recording medium such as a disc or drum. The tracks can be on different surfaces, or if discs are used, the tracks can be on the same or opposite faces of the same disc. If the tracks are on different surfaces, the surfaces should be rotated in synchronism.

The concepts of this invention are independent of head placement. For example, when the redundant tracks are on the same disc, the respective heads for these redundant tracks may be located at the same or different angular positions relative to that disc.

Another advantage of the present invention is high reliability in recording. This is the result of recording the same information on separate tracks using independent electronics. The probability of data being incorrectly written on both tracks is very low.

The invention can best be understood by reference to the following description taken in connection with the accompanying illustrative drawings.

DESCRIPTION OF THE PREFERRED EMBODIMENT

Figure 1A:
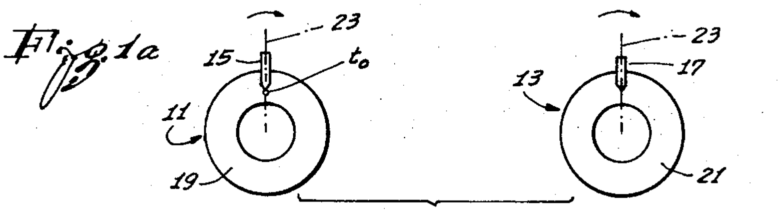
FIGS. 1*a*–1*d* are schematic views illustrating how heads can be controlled to record the same information on different tracks in an out-of-phase relationship.

FIG. 1*a* shows two memory discs 11 and 13 having read/write heads 15 and 17 mounted adjacent the discs, respectively. The memory discs 11 and 13 include a coating of a magnetic recording medium which defines recording surfaces 19 and 21, respectively. The discs 11 and 13 are suitably mounted for rotation together about the same or a different rotational axis at the same angular velocity. In the position shown in FIG. 1*a*, the discs 11 and 13 are in an initial or zero degree position as evidenced by the angular position of the reference lines 23. The initial or zero degree position is defined as the position of the discs 11 and 13 about their rotational axes at the instant that the head 15 begins the write operation, i.e., the instant at which the head 15 places an initial bit $t_o$ on the recording surface 19. The head 15 may be selected in any suitable manner as the initial write head such as by a controller (not shown).

Figure 1B:
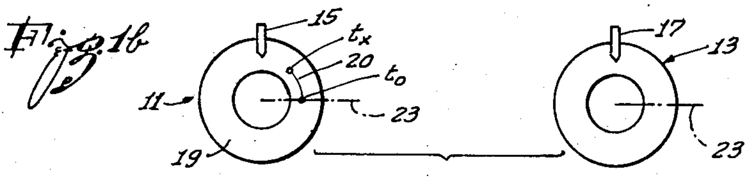

FIG. 1*b* shows the discs 11 and 13 after they have rotated through an angle of 90° clockwise from the initial position shown in FIG. 1*a*. FIG. 1*b* shows that the head 15 has written information $t_o$ to $t_x$ on the face 19 to thereby define a track 20. Although in FIG. 1*b* the information recorded by the head 15 took up less than a 90° sector, it should be understood that the write operation of the head 15 may continue for any time period.

Figure 1C:
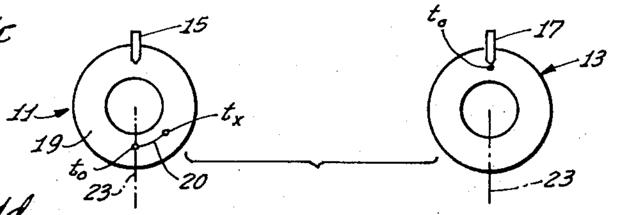

FIG. 1*c* shows the discs 11 and 13 rotated 180° clockwise from the initial position shown in FIG. 1*a*. The information $t_o$–$t_x$ written by the head 15 has been angularly advanced as illustrated. In addition, the head 17 now writes its first bit of information $t_o$ which is identical to the bit $t_o$ written 180° earlier by the head 15. The routing of information to the head 17 can be delayed in any suitable manner such as by a 180° buffer (not shown).

Figure 1D:
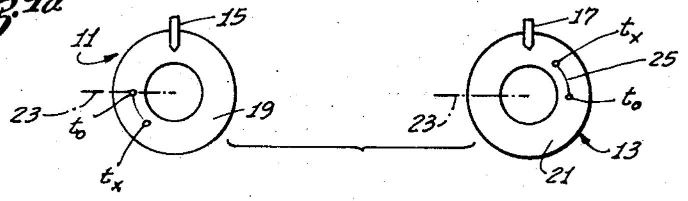

FIG. 1*d* shows the discs 11 and 13 advanced 270° clockwise from the initial position shown in FIG. 1*a*. During the time that the disc 13 rotates between the positions of FIGS. 1*c* and 1*d*, the head 17 writes the information $t_o$–$t_x$ on the recording surface 21 to thereby define a track 25. The data represented by the bits $t_o$–$t_x$ on the recording surface 21 is identical to the data represented by the bits $t_o$–$t_x$ on the recording face 19.

In FIG. 1*d*, the corresponding bits of data $t_o$–$t_x$ on the recording faces 19 and 21 are 180° apart. The data recorded on the faces 19 and 21 is out of phase in that at any one instant the angular displacement between the bit on the face 19 and the head 15 is different from the angular displacement between the corresponding bit on the face 21 and the head 17. Thus, at any one instant one of the bits $t_o$ is no more than 180° away in the direction of rotation from the head which wrote it.

For the read operation, the head 15 or 17 which is closer to the information is selected in any suitable manner to do the reading. For example, if a read command were received for the information $t_o$–$t_x$ with the discs in the position of FIG. 1*d*, the head 15 would be selected as the read head because it is closer to that information as measured in the direction of rotation.

Accordingly, access is as rapid with this system as in a two-head per track system. Moreover, only the head which wrote the information is called upon to read that information with the result that no misalignment problems between the track and the head is experienced.

Figure 2:
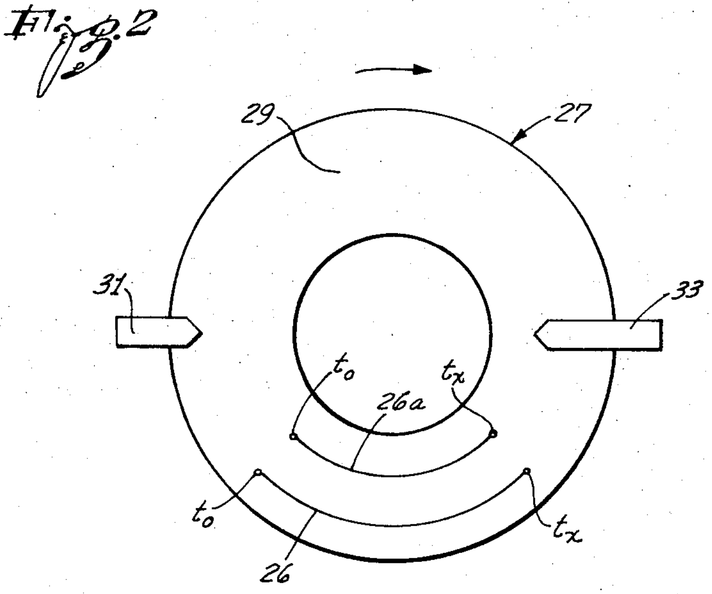
FIG. 2 is a schematic view further illustrating the concept of the present invention.

FIG. 2 illustrates the concept of the invention with redundant data tracks 26 and **26*a* being provided on the same surface of a memory disc 27. The memory disc 27 has a recording face 29. Read/write heads 31 and 33 are suitably mounted adjacent the disc 27 in position to write information on the face 29 and to read information therefrom. In FIG. 2, the read/write heads 31 and 33** are spaced apart 180°; however, this spacing is merely illustrative.

In operation, the disc 27 is rotated clockwise and the read/write head 31 is operated to record bits of data $t_o$–$t_x$ along the track 26. After the disc 27 has rotated 180° from the position it occupied at the time the bit $t_o$ was written by the head 31, the head 33 writes the bit $t_o$ on the track **26*a*. As the disc 27 continues to rotate the information $t_o$–$t_x$ is recorded on the track 26*a*. The tracks 26 and 26*a* contain the same information. The heads 31 and 33 can read the information along tracks 26 and 26*a***, respectively, as described in connection with FIGS. 1*a*–1*d*. Although the tracks 26 and **26*a* cover the same angular section of the disc 27, they are nevertheless out of phase with respect to their associated heads 31 and 33 in that at any one instant, one of the bits $t_o$ is more than 180° in the direction of rotation from its associated head. Thus, two-head per track access time is obtainable regardless of the relative positions of the heads 31 and 33**.

Figure 3:
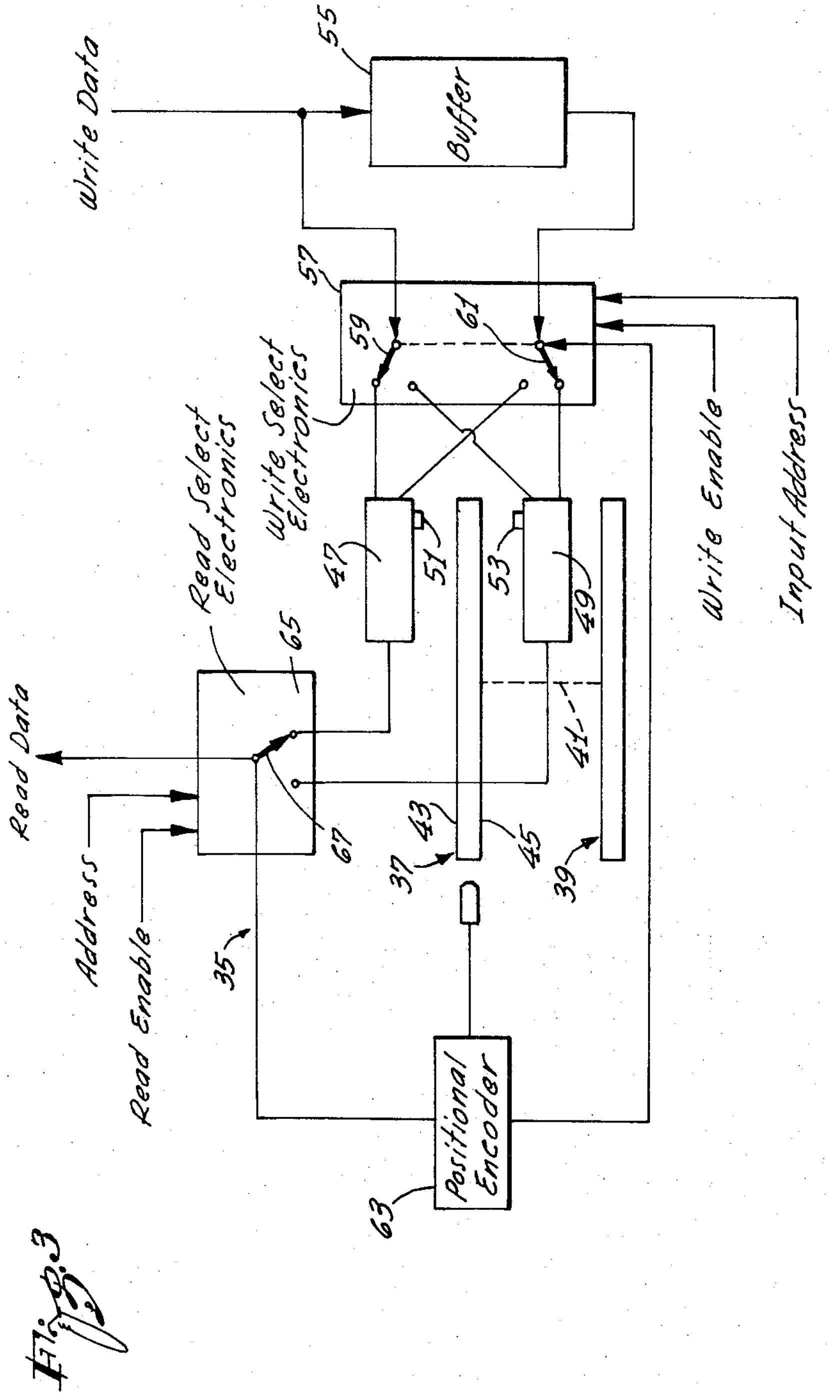
FIG. 3 is a schematic view of a disc memory constructed in accordance with the teachings of this invention.

The concepts described hereinabove with reference to FIGS. 1 and 2 can be implemented in many different ways by those skilled in the art. FIG. 3 shows one manner in which the concepts described in connection with FIGS. 1 and 2 can be implemented. No attempt is made herein to show all of the details of an actual system as such details can be easily supplied by those skilled in the art.

FIG. 3 shows a memory 35 which includes a plurality of memory discs including memory discs 37 and 39 all of which are suitably mounted and interconnected for rotation together about a common rotational axis 41. The disc 37 has upper and lower recording faces 43 and 45, respectively, with each of the recording faces being formed by a magnetic recording medium capable of having bits of data recorded thereon in concentric circular tracks. The disc 39 is identical.

Head matrices 47 and 49 are mounted closely adjacent the recording faces 43 and 45, respectively. The head matrix 47 includes a plurality of heads one for each of the tracks on the face 43 including a head 51. Similarly, the head matrix 49 includes a plurality of heads, one for each track on the recording surface 45 including a head 53. Each of the heads of the matrices 47 and 49 can write information on its associated recording surface and read information from the same recording surface. Heads (not shown) may be similarly located with respect to the other memory discs of the memory 35.

For the write operation, data is simultaneously routed to a buffer 55 and to write select electronics 57. The same data is also fed from the buffer to the write select electronics 57 but this transmission of data is delayed for a period corresponding to a predetermined number of degrees of rotation of the memory discs 37 and 39.

The write select electronics 57 includes the necessary electronics and electrical apparatus to select which of the head matrices 47 and 49 and which head of the selected matrix will perform the initial write operation and which will perform the delayed write operation. The write select electronics also includes the write drivers necessary for data recording.

The head matrix select capability is represented schematically in FIG. 3 in the form of two switches 59 and 61. In the positions of the switches as shown in FIG. 3, the head matrix 47 has been selected to perform the initial write operation and the head matrix 49 has been selected to perform the delay write operation.

The write select electronics 57 makes the head matrix selection in response to an input address from a controller (not shown) and input from a positional encoder 63 which continuously monitors the angular position of the memory disc 37 about the rotational axis 41. As all of the discs rotate together, it is only necessary to monitor the position of one of the discs. Corresponding addresses on the two faces 43 and 45 are out of phase. Specifically, corresponding addresses on the discs 37 and 39 are 180° apart so that at any one instance, one of the corresponding addresses is no more than 180° from its associated head. The disc position input from the positional encoder 63 and the input address are utilized by the write select electronics 57 to select the head matrix which is closer (as measured angularly in the direction of disc rotation) to the input address on the associated recording face 43 or 45, and this head matrix is selected for the initial write operation and the other head matrix is selected for the delayed write operation.

In addition, the write select electronics 57 also selects the particular head for the write operation. In this instance, the heads 51 and 53 have been selected for the initial and delayed write operations, respectively. The head selection function is made in response to the input address.

The write select electronics 57 is also responsive to appropriate controller or computer commands to allow transmission of data to the heads 51 and 53 for recording. As shown by way of example in FIG. 3, the write select electronics 57 receives a write enable command from a controller (not shown), and in response thereto routes write data through the switch 59 to the head 51 for the initial write operation. Thus, the write enable command tells the write select electronics 57 that the correct address has been reached, and the initial write operation should begin.

The buffer 55 delays the transmission of data to the write select electronics until the discs have rotated 180° from the instant at which the first bit of data is recorded by the head 51 on the disc 37. Suitable means such as the write enable command may be used to inform the write select electronics 57 that the correct address on the face 45 has been reached and that the delayed write operation should begin. In response, the write select electronics routes the delayed data from the buffer 55 through the switch 61 to the head 53 for recording on the face 45. This results in recording data as described in connection with FIGS. 1*a*–1*d* and 2.

For the read operation, it is desired to select the head matrix which is nearer the address sought and the particular head of that matrix which is to read. Head matrix selection is made by read select electronics in response to the address of the information and position information from the positional encoder 63. The read select electronics 65 is shown schematically to include a switch 67 for selecting one of the head matrices 47 and 49 for the read operation. As shown in FIG. 3, the head matrix 47 has been selected.

The read select electronics 65 selects the appropriate head of the selected matrix for the read operation in response to the address. When the correct address is at the selected head, the controller sets the read enable command true, and in response thereto the read select electronics 65 provides read data to the controller (not shown).

Because the data on the discs 37 and 39 is out of phase relative to their respective head matrices 47 and 49, the read operation can be performed in a manner substantially similar to a two-head per track system.

Although exemplary embodiments of the invention have been shown and described, many changes, modifications and substitutions may be made by one having ordinary skill in the art without necessarily departing from the spirit and scope of this invention.

We claim:

1. A memory comprising:

means defining a magnetic recording medium having first and second regions on which information can be stored, said regions being rotatable together at substantially the same angular velocity;

a first read/write head mounted in an operative relationship relative to the first region, said first read/write head being adapted to write information on the first region to thereby define a first track and to read the same information so written on the first track;

a second read/write head mounted in an operative relationship relative to the second region, said second read/write head being adapted to write information on the second region to thereby define a second track and to read the same information so written on the second track; and means for controlling said read/write heads so that said read/write heads write the same information upon their respective tracks but out of phase whereby at any instant any bit of said information on said first track is angularly spaced from said first read/write head a different number of degrees than the angular spacing between the corresponding bit of information on the second track and said second read/write head.

2. A memory as defined in claim 1 wherein corresponding bits of information on the first and second tracks are approximately 180° out of phase.

3. A memory as defined in claim 1 wherein said first and second regions include first and second surfaces, respectively, of a memory disc.

4. A memory as defined in claim 1 wherein said first and second regions includes first and second memory discs, respectively.

5. A memory comprising:

first means defining a magnetic recording medium having first and second regions on which information can be stored;

means for mounting said regions for rotation together at substantially the same angular velocity;

means for writing information on the first region as the first region rotates beginning at a preselected time;

means for writing said information on the second region as the second region rotates with such writing beginning at a time at which said regions have rotated through a number of degrees other than an even multiple of 360° since said preselected time; and said means for writing on the first region including a first read/write head and said means for writing on the second region including a second read/write head, each of said read/write heads reading only the information previously written by it on the associated region.

6. A memory as defined in claim 5 wherein said number of degrees is approximately 180°.

7. A memory comprising:

means defining a plurality of regions on which information can be stored;

a plurality of read/write heads mounted in an operative relationship relative to said regions, respectively;

said regions and said heads being relatively rotatable;

each of said read/write heads being adapted to write information on the associated region to thereby define a track and to read the same information so written on such track; and means for controlling said read/write heads so that said read/write heads write the same information upon their respective tracks in an out of phase relationship.

8. A method of storing and retrieving information in a memory comprising:

providing first and second regions on which information can be recorded;

providing first and second read/write heads;

synchronously rotating said first and second regions relative to the first and second read/write heads, respectively;

writing selected information on the first region while the regions are rotating to thereby define a first track, said step of writing being carried out with said first read/write head and beginning at a known instant;

writing said selected information on the second region while the regions are rotating to thereby define a second track, said last mentioned step of writing being carried out with said second read/write head; and delaying said last mentioned step of writing until said regions have rotated through a predetermined number of degrees following said known instant, said predetermined number of degrees being a number of degrees which is not an even multiple of 360°.

9. A method as defined in claim 8 wherein said predetermined number of degrees is approximately 180°.

10. A method as defined in claim 8 including reading the selected information on the first track using one of the read/write heads.

11. A method as defined in claim 10 including selecting the read/write head which is angularly displaced the smallest amount in the direction of rotation of the associated track from the selected information, the selected read/write head being said one read/write head.

12. A memory comprising:

first means defining a recording medium having first and second regions on which information can be stored;

first writing means for writing information on the first region, said first writing means and said first region being relatively movable;

second writing means for writing said information on the second region, said second writing means and said second region being relatively movable;

means for controlling the relative movement between said first and second writing means and said first and second regions;

means for preventing said first and second writing means from obliterating said information on said second and first regions, respectively, whereby said information can be present at both of said regions indefinitely;

first reading means for reading the information recorded on said first region by said first writing means;

second reading means for reading the information recorded on said second region by said second writing means; and means for controlling said first and second writing means so that the location of the information on the first region relative to the first reading means is different from the location of the information on the second region relative to the second reading means.

* * * * *